(12) United States Patent
Inui et al.

(10) Patent No.: US 7,717,223 B2
(45) Date of Patent: May 18, 2010

(54) OUTPUT SHAFT OF POWER UNIT

(75) Inventors: Hiroatsu Inui, Saitama (JP); Shinya Koyama, Saitama (JP); Hiromi Sumi, Saitama (JP); Eiji Kittaka, Saitama (JP); Hiroyuki Oketani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 214 days.

(21) Appl. No.: 11/902,475

(22) Filed: Sep. 21, 2007

(65) Prior Publication Data

US 2008/0076585 A1 Mar. 27, 2008

(30) Foreign Application Priority Data

Sep. 26, 2006 (JP) ............................. 2006-261278

(51) Int. Cl.
*B60K 17/22* (2006.01)
(52) U.S. Cl. .................... 180/376; 180/374; 180/379; 180/380
(58) Field of Classification Search ................ 180/343, 180/371, 374, 375, 376, 379, 380
See application file for complete search history.

(56) References Cited

U.S. PATENT DOCUMENTS

| | | | | |
|---|---|---|---|---|
| 5,515,940 | A * | 5/1996 | Shichinohe et al. | 180/376 |
| 6,296,073 | B1 * | 10/2001 | Rioux et al. | 180/292 |
| 6,510,916 | B2 * | 1/2003 | Hori et al. | 180/374 |
| 6,632,144 | B1 * | 10/2003 | Narita et al. | 464/179 |
| 6,637,539 | B2 * | 10/2003 | Rioux et al. | 180/339 |
| 6,725,962 | B1 * | 4/2004 | Fukuda | 180/292 |
| 6,880,428 | B2 * | 4/2005 | Nishi et al. | 74/606 R |
| 2001/0000562 | A1 * | 5/2001 | Abend et al. | 56/13.3 |
| 2002/0129987 | A1 * | 9/2002 | Abend et al. | 180/374 |
| 2003/0057009 | A1 * | 3/2003 | Abend et al. | 180/375 |
| 2008/0223651 | A1 * | 9/2008 | Smith et al. | 180/376 |

FOREIGN PATENT DOCUMENTS

JP 2003-139124 A 5/2003

\* cited by examiner

*Primary Examiner*—Toan C To
(74) *Attorney, Agent, or Firm*—Birch, Stewart, Koalsch & Birch, LLP

(57) ABSTRACT

An output shaft of a power unit having a driven gear for supplying a power of an internal combustion engine via a transmission mechanism and for outputting the power to an outside of a unit case. Borne members are connected respectively at each end of a cylindrical member of the output shaft. The borne members are rotatably supported by the unit case via a pair of bearings. The driven gear is fitted to one of the borne members in a position adjacent to one of the bearings. As a result, the output shaft of the power unit can be manufactured by a compact manufacturing apparatus, and the output shaft can be reduced in weight while maintaining the strength.

19 Claims, 8 Drawing Sheets

OUTPUT SHAFT OF POWER UNIT

CROSS-REFERENCE TO RELATED APPLICATION

The present application claims priority under 35 U.S.C. §119 to Japanese Patent Application No. 2006-261278, filed Sep. 26, 2006, the entire contents of which are hereby incorporated by reference.

BACKGROUND OF THE INVENTION

1. Field of the Invention

The present invention relates to an output shaft of a power unit integrally having an internal combustion engine and a transmission.

2. Description of Background Art

In the power unit, rotation of a crankshaft of the internal combustion engine is transmitted to the output shaft after having performed shift transmission by the transmission, and rotation of the output shaft projected from a unit case is transmitted to a drive wheel to rotate the same.

Since a high load is applied to the output shaft, a large output shaft manufactured by forging is normally used for securing strength (for example, JP-A-2003-139124.

The output shaft disclosed in JP-A-2003-139124 is a solid shaft manufactured entirely by forging and hence has a heavy weight.

However, by an ingenuity to increase the diameter of the output shaft only at borne portions, positioning is facilitated and slight reduction of the weight is achieved.

However, in order to reduce the diameter of portions other than the large-diameter borne portion of the output shaft, there is a limit in strength, and the reduction of the weight is only a small extent. In addition, a manufacturing device for integrally forming the entire output shaft by forging is also upsized, so that the facility cost is high.

In view of such problems, it is an object of the present invention to provide an output shaft of a power unit which may be manufactured by a small-sized manufacturing device, and may be reduced in weight while maintaining the strength.

SUMMARY AND OBJECTS OF THE INVENTION

In order to achieve the above-described object, according to a first aspect of the present invention, an output shaft of a power unit having a driven gear is provided for supplying a power of an internal combustion engine of the power unit via a transmission mechanism for outputting a power to the outside of a unit case. Borne members are formed respectively at both ends which are rotatably supported by the unit case via bearings, the borne members at the both ends are connected by a cylindrical member, and the driven gear is fitted to one of the borne members in adjacent to the bearing.

According to a second aspect of the present invention, the unit case includes a crankcase divided into an upper and lower halves and both case members to be connected to both outsides of the crankcase in the direction of a crankshaft, and the respective borne members at the both ends of the output shafts are rotatably supported by both of the respective case members via the bearings.

According to a third aspect of the present invention, the power unit is mounted to a vehicle with the crankshaft oriented in the fore-and-aft direction, and a through hole for penetrating the output shaft through is formed on one of the upper and lower crankcase halves in adjacent to a bearing portion of a transmission shaft which is rotatably supported by the crankcase.

Advantages of the invention include the following:

According to the first aspect of the present invention, since the output shaft is configured by connecting the borne members formed respectively at the both ends by the cylindrical member, and the driven gear is fitted to one of the borne members in adjacent to the bearing, weight reduction is achieved while securing rigidity and strength.

The manufacturing device for forming the compact borne members as parts of the output shaft may also be downsized, and hence the facility cost is low.

According to the second aspect of the present invention, since the respective borne members at the both ends of the output shaft are rotatably supported via bearings by the both case members which are connected to the both outsides of the crankcase divided into the upper and lower halves in the direction of the crankshaft respectively, the load of the crankcase may be reduced. Hence the cylindrical member may be elongated so as to bring the borne members at the both ends apart from each other, whereby a structure in which distortion of the output shaft at one end hardly affects the other end is achieved.

According to the third aspect of the present invention, since the through hole adjacent to the bearing portion of the transmission shaft may be formed on one of the upper and lower crankcase halves and the output shaft is penetrated through the through hole, the output shaft may be positioned as close as possible to the transmission shaft, so that the power unit may be downsized.

Even though the output shaft is placed close to the transmission shaft, the transmission shaft is rotatably supported by the crankcase, while the output shaft is rotatably supported by the case member. Therefore, the rigidity of the both bearing portions may easily be secured, and the both shafts may be rotatably supported in a desired manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to FIG. 1 to FIG. 6, an embodiment of the present invention will be described.

Figure 1:
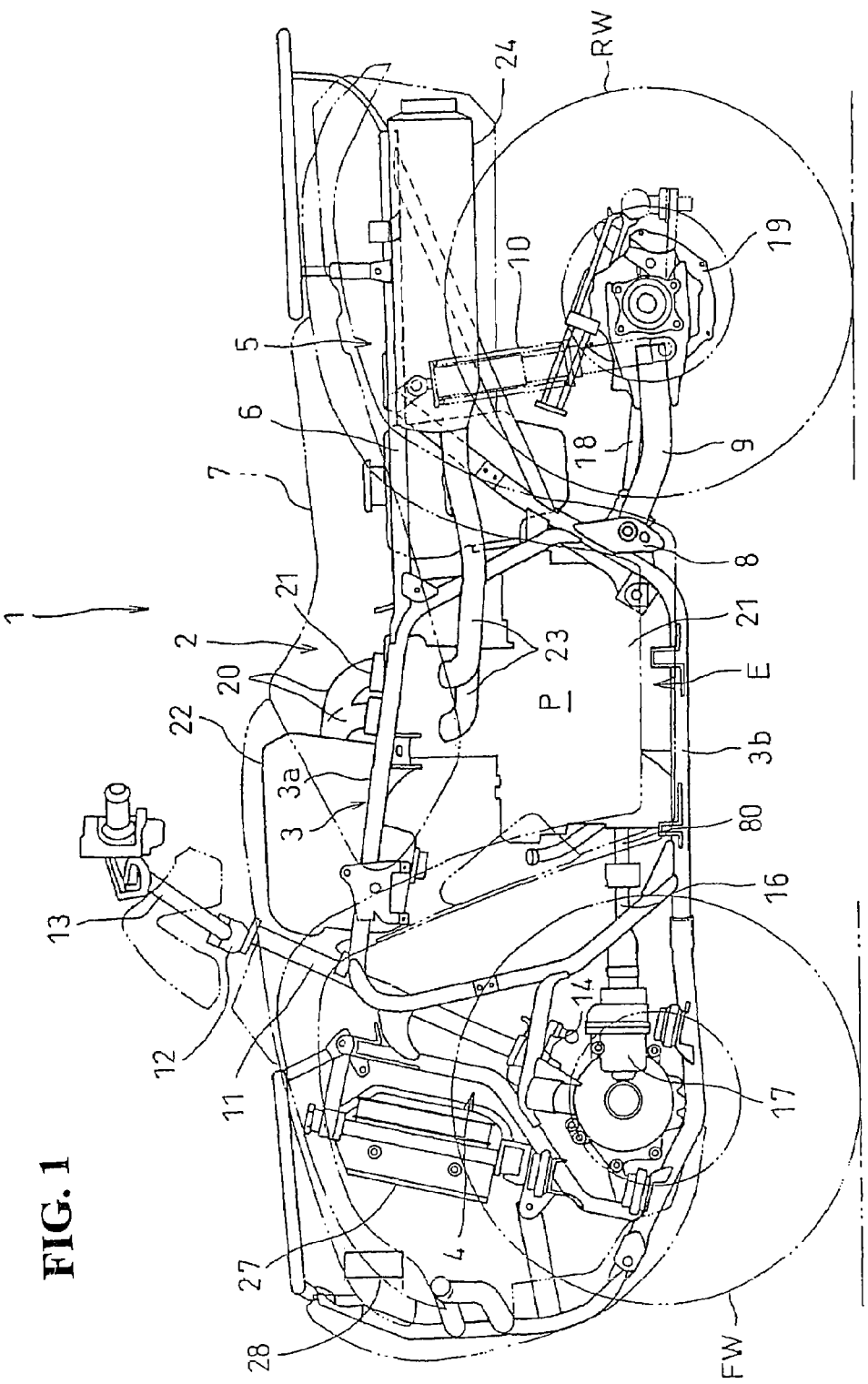
FIG. 1 is a side view of a rough-terrain traveling vehicle in which a power unit according to an embodiment of the present invention is mounted with a vehicle body cover or the like is removed.
Figure 2:
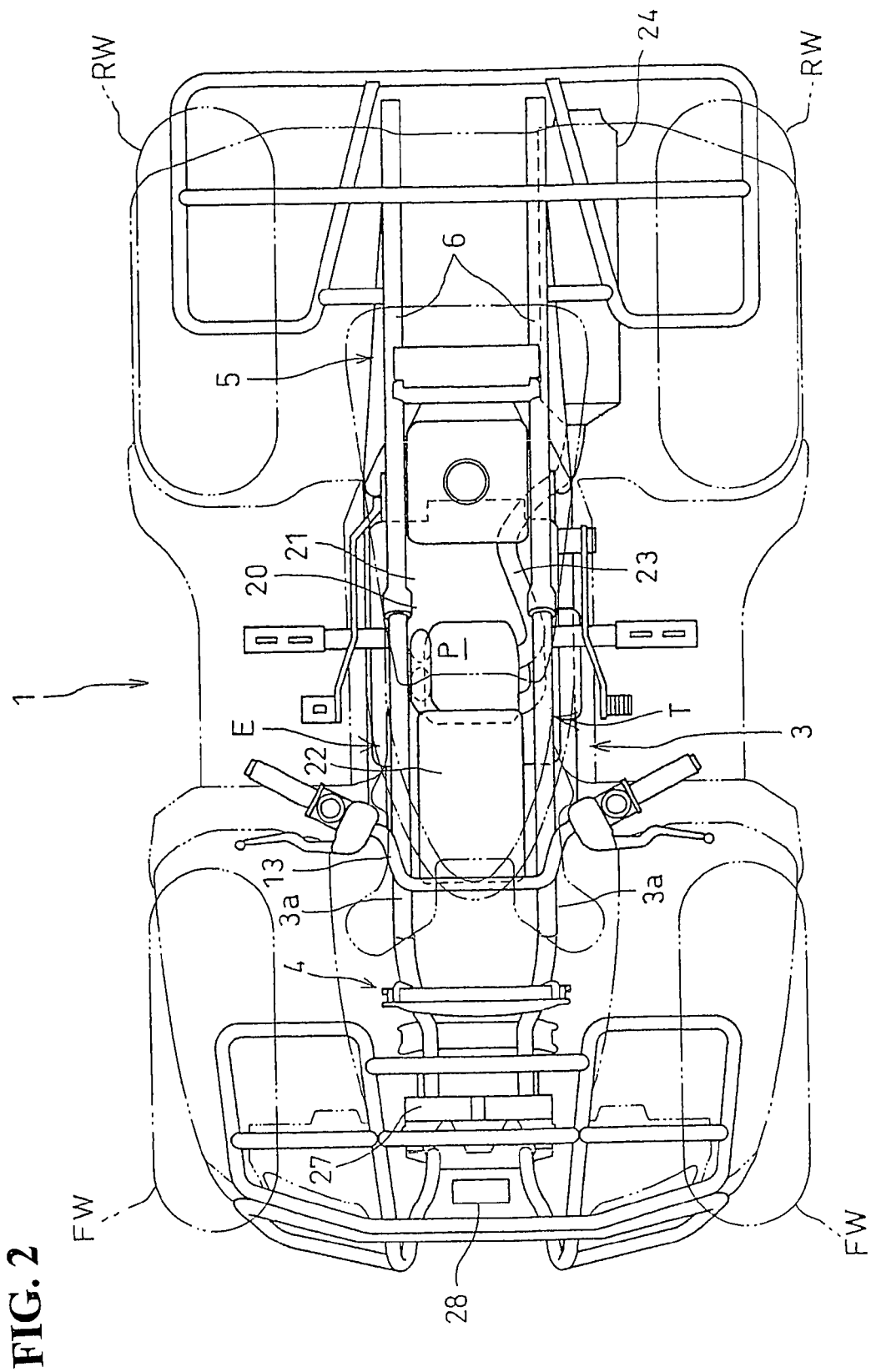
FIG. 2 is a plan view of the same.

A side view of a rough-terrain traveling vehicle 1 in which a water-cooled internal combustion engine E according to this embodiment is mounted and a vehicle body cover or the like is removed is shown in FIG. 1, and a plan view of the same is shown in FIG. 2.

In this embodiment, the front, rear, left and right are defined on the basis of a direction viewing in the direction of travel of the vehicle.

The rough-terrain traveling vehicle 1 is a saddle type four-wheel vehicle, and a pair of left and right front wheels FW on which low-pressure balloon tires for rough-terrain are mounted and a pair of left and right rear wheels RW on which the same balloon tires are mounted are suspended in the front and rear of a vehicle body frame 2.

The vehicle body frame 2 is configured with a plurality of types of steel material joined together, and includes a center frame portion 3 in which a power unit P having the internal combustion engine E and a transmission T provided integrally in a crankcase 31 is mounted, a front frame 4 connected to the front portion of the center frame portion 3 for suspending the front wheels FW, and a rear frame portion 5 connected to the rear portion of the center frame portion 3 and having a seat rail 6 for supporting a seat 7.

The center frame portion 3 includes a pair of left and right upper pipes 3a and a pair of left and right lower pipes 3b, the upper pipes 3a each substantially forming three sides by being bent downward at front and rear thereof, and the lower pipes 3b each substantially forming one side to form substantially a rectangular shape in side view, and both of the left and right pipes are connected by a cross member.

Swing arms 9 whose front ends are supported rotatably via a shaft by pivot plates 8 fixed to portions of the lower pipes 3b extending obliquely upward at the rear end thereof is provided swingably, rear cushions 10 are provided between the rear portion of the swing arms 9 and the rear frame portion 5, and the rear wheels RW are suspended by rear final reduction gear units 19 provided at the rear ends of the swing arms 9.

A steering column 11 is supported at the lateral center of the cross member extending between the front end portions of the left and right upper pipes 3a, and a steering handle 13 is connected to the upper end portion of a steering shaft 12 steerably supported by the steering column 11, and the lower end portion of the steering shaft 12 is connected to a front wheel steering mechanism 14.

The internal combustion engine E of the power unit P is a water-cooled two-cylinder internal combustion engine and is mounted to the center frame portion 3 with a crankshaft 30 oriented in the fore-and-aft direction of a vehicle body, that is, in a so-called vertical posture.

The transmission T of the power unit P is arranged on the left-hand side of the internal combustion engine E, and an output shaft 80 oriented in the fore-and-aft direction is projecting toward the front and rear from the transmission T at a position which is displaced toward the left, so that a rotational force of the output shaft 80 is transmitted from the front end of the output shaft 80 to the left and right front wheels FW via a front drive shaft 16 and a front final reduction gear unit 17, and is transmitted from the rear end thereof to the left and right rear wheels RW via rear drive shafts 18 and the rear final reduction gear units 19.

A radiator 27 is supported in the front frame portion 4 of the vehicle body frame 2, and an oil cooler 28 is disposed in front thereof.

Figure 3:
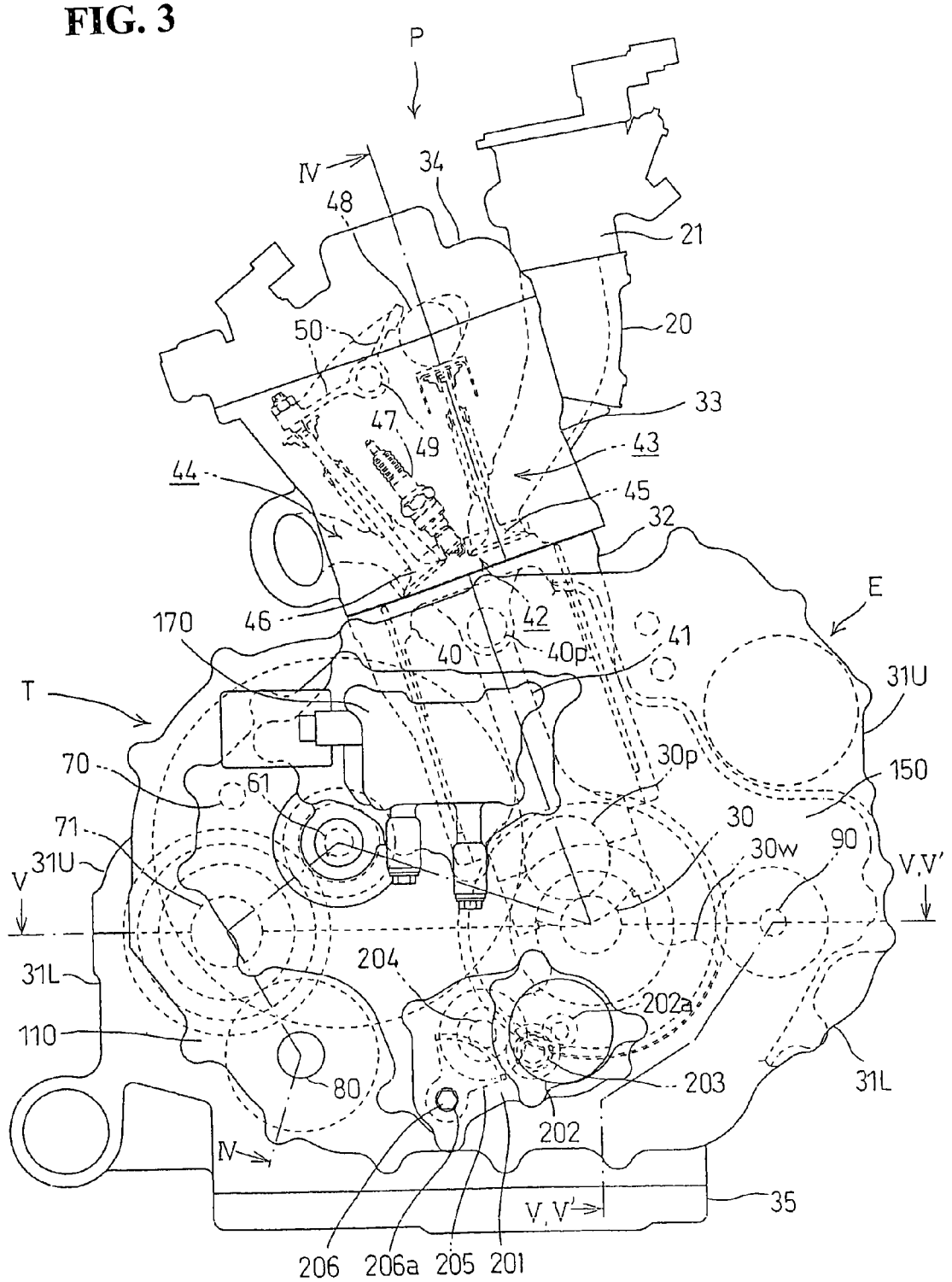
FIG. 3 is a rear view of the power unit.

Referring to FIG. 3 which is a rear view of the power unit P, the crankcase 31 which contains the internal combustion engine E and the transmission T of the power unit P in the interior thereof has a vertically divided structure divided into upper and lower halves, that is, an upper crankcase 31U and a lower crankcase 31L, along a plane including the crankshaft 30.

A cylinder block portion 32 formed integrally with the upper crankcase 31U at the upper portion thereof with two cylinder bores 32c arranged in series are formed so as to incline slightly toward the left and extend upward, a cylinder head 33 is placed on the top of the cylinder block portion 32, and the cylinder head 33 is covered with a cylinder head cover 34.

On the other hand, an oil pan 35 is attached to the bottom of the lower crankcase 31L.

Curved air-intake pipes 20 extending substantially upward from a right wall of the cylinder head 33 are connected to an air cleaner 22 arranged above the internal combustion engine E with the intermediary of a throttle body 21, and a curved exhaust pipe 23 extending rearward from a left wall of the cylinder head 33 is connected to an exhaust muffler 24 attached on the left-hand side of the rear frame portion 5.

Figure 4:
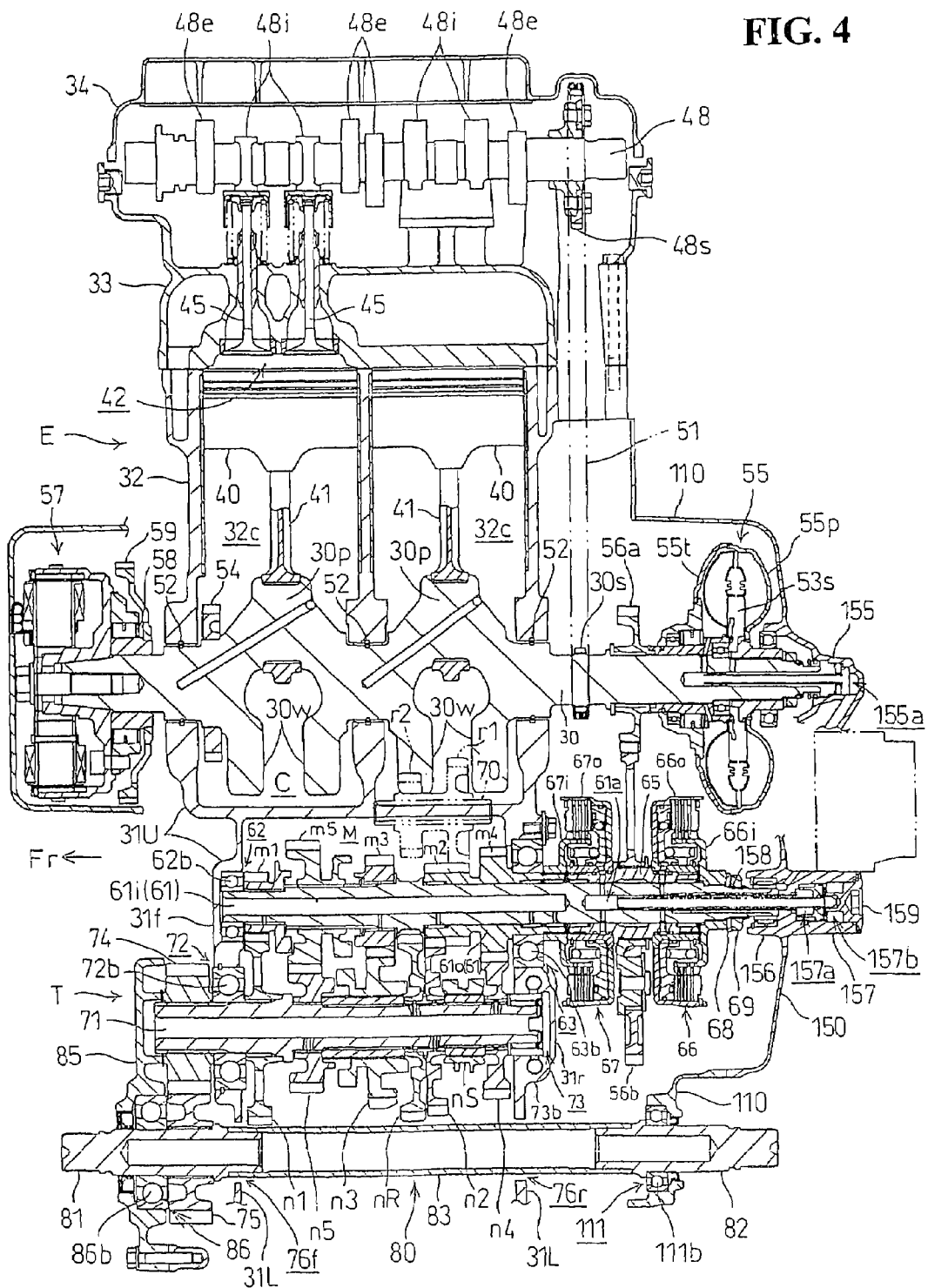
FIG. 4 is a developed cross-sectional view of the power unit (taken along the line IV-IV in FIG. 3)

Referring now to FIG. 3 and FIG. 4, pistons 40 are fitted to the two cylinder bores 32c of the cylinder block portion 32 so as to be capable of sliding reciprocation, and crank pins 30p between crank webs 30w and 30w of the crankshaft 30 and piston pins 40p of the pistons 40 are connected by connecting rods 41, so that a crank mechanism is configured.

In the cylinder head 33, each cylinder bore 32c includes a combustion chamber 42 opposing the pistons 40, an air-intake port 43 opening into the combustion chamber 42 and extending rightward and upward so as to be opened and closed by a pair of air-intake valves 45, exhaust ports 44 extending forward so as to be opened and closed by a pair of exhaust valves 46, and ignition plugs 47 mounted thereto so as to be exposed into the combustion chamber 42.

The air-intake pipes 20 are connected to the air-intake ports 43.

The upper ends of the air-intake valves 45 come into abutment with air-intake cam robs 48i of a camshaft 48, which is rotatably supported by the cylinder head 33 via a shaft, one end of a locker arm 50 rotatably supported by a rocker arm shaft 49 via a shaft comes into abutment with exhaust cam robs 48e of the camshaft 48, and the upper ends of the exhaust valves 46 come into abutment with the other ends of the rocker arms 50.

Therefore, the air-intake valves 45 and the exhaust valves 46 open and close the air-intake ports 43 and the exhaust ports 44 synchronously with the rotation of the crankshaft 30 by the camshaft 48 at a predetermined timing.

In order to do so, the camshaft 48 is fitted with a cam sprocket 48s at the rear portion thereof, and a timing chain 51 is wound between a drive sprocket 30s fitted to the portion of the crankshaft 30 near the rear end portion thereof and the cam sprocket 48s (see FIG. 4), so that the camshaft 48 is driven to rotate at half a revolving speed of the crankshaft 30.

The crankshaft 30 is rotatably supported by being clamped between the upper crankcase 31U and the lower crankcase 31L via a plane bearing 52 and, as shown in FIG. 4, the rear portion of the crankshaft 30 projected rearward from a crank chamber is formed with the drive sprocket 30s, and a primary drive gear 56a is provided on further rear ends thereof via a fluid coupling 55 as a fluid joint.

The fluid coupling 55 includes a pump impeller 55p fixed to the crankshaft 30, a turbine runner 55t opposed thereto, and a stator 53s.

The primary drive gear 56a is joined with the turbine runner 55t which is rotatable with respect to the crankshaft 30, and the power from the crankshaft 30 is transmitted to the primary drive gear 56a via hydraulic oil.

The primary drive gear 56a meshes with a primary driven gear 56b which is rotatably supported by a main shaft 61, described later, and transmits the rotation of the crankshaft 30 to the main shaft 61 side.

On the other hand, a starting driven gear 59 is rotatably supported by the front side portion of the crankshaft 30 projecting forward from a crank chamber C via an AC generator 57 and a one way clutch 58.

A balancer shaft drive gear 54 is fitted to a portion of the crankshaft 30 extending along the inner surface of the front wall of the crank chamber C.

A transmission chamber M is defined by being partitioned by a partitioning wall in the left side of the crank chamber C that accommodates the crank webs 30w of the crankshaft 30.

A transmission gear mechanism 60 accommodated in the transmission chamber M is a constantly engaging gear mechanism, in which the main shaft 61 is rotatably supported by the upper crankcase 31U at a position leftward and obliquely upward of the crankshaft 30, and a counter shaft 71 is rotatably supported on a partitioning plane by being sandwiched between the upper and lower crankcases 31U and 31L at a position leftward and obliquely downward of the mainshaft 61 and leftward of the crankshaft 30 (see FIG. 3).

The main shaft 61 includes an inner cylinder 61i and an outer cylinder 61o which rotatably fits on part of the inner cylinder 61i. The front end of the inner cylinder 61i is rotatably supported by a bearing recess 62 formed on a front wall 31f of the transmission chamber M of the upper crankcase 31U with the intermediary of a bearing 62b, the outer cylinder 61o is fitted on the inner cylinder 61i substantially at a center position on the rear side so as to be capable of relative rotation, and part of the outer cylinder 61o is rotatably supported by a bearing opening 63 formed on a rear wall 31r of the transmission chamber M with the intermediary of a bearing 63b and is supported together with the inner cylinder 61i.

The outer cylinder 61o is integrally formed with a second transmission drive gear m2 and a fourth transmission drive gear m4 at the front and back respectively on a portion inside the bearing 63b and the outer portion projects partly outward from the bearing 63b.

On the inner cylinder 61i, a first transmission drive idle gear m1, a fifth transmission drive gear m5 formed integrally with a shifter and spline-fitted to the inner cylinder 61i and a third transmission drive idle gear m3 in sequence from the front on the front side of the second and fourth transmission drive gears m2 and m4 on the outer cylinder 61o are supported, and the outer portion of the inner cylinder 61i projects further rearward from the outer portion of the outer cylinder 61o.

The bearing recess 62 formed on the front wall 31f is formed to have a small inner diameter for supporting the front end of the inner cylinder 61i having a small diameter, while the bearing opening 63 formed on the rear wall 31r is formed to have an inner diameter smaller than the fifth transmission drive gear m5 having the largest diameter and larger than the diameter of the fourth transmission drive gear m4, and is used for assembling work of the main shaft 61.

An input sleeve 65 is rotatably fitted on the outer portion of the inner cylinder 61i in juxtaposition with the outer cylinder 61o, and the primary driven gear 56b is fitted at the center of the input sleeve 65, so that the primary driven gear 56b meshes with the primary drive gear 56a on the side of the crankshaft 30.

A first transmission clutch 66 is assembled to the input sleeve 65 at a position rearwardly of the primary driven gear 56b, and a second transmission clutch 67 is assembled thereto at a position forwardly of the primary driven gear 56b.

A pair of the first transmission clutch 66 and the second transmission clutch 67 are hydraulic multiple disk clutches having the same structure.

The first transmission clutch 66 includes a cup-shaped clutch outer 66o opening rearward integrally fitted to the input sleeve 65, and a clutch inner 66i integrally fitted to the internal cylinder 61i.

On the other hand, the second transmission clutch 67 includes a cup-shaped clutch outer 67o opening forward integrally fitted to the input sleeve 65 and a clutch inner 67i integrally fitted to the outer portion of the outer cylinder 61o.

When hydraulic pressure is supplied to the first transmission clutch 66 and hence the clutch outer 66o and the clutch inner 66i are connected, the rotation of the input sleeve 65 which is integral with the primary driven gear 56b is transmitted to the rotation of the second and fourth transmission drive gears m2 and m4 of the outer cylinder 61o, and when hydraulic pressure is not supplied, the clutch outer 66o and the clutch inner 66i are disconnected and the rotation is not transmitted to the second and fourth transmission drive gears m2 and m4 of the outer cylinder 61o.

In the same manner, when the hydraulic pressure is supplied to the second transmission clutch 67 and hence the clutch outer 67o and the clutch inner 67i are connected, the rotation of the input sleeve 65 which is integral with the primary driven gear 56b is transmitted to the inner cylinder 61i, and hence the fifth transmission drive gear m5 spline-fitted to the inner cylinder 61i is rotated, and when the hydraulic pressure is not supplied, the clutch outer 67o and the clutch inner 67i are disconnected and hence the rotation is not transmitted to the fifth transmission drive gear m5 on the inner cylinder 61i.

The counter shaft 71 supported on a partitioning plane by being sandwiched between the upper and lower crankcases 31U and 31L at a position leftward and obliquely downward of the main shaft 61 as described above is rotatably supported at the front portion by a bearing opening 72 formed on the front wall 31f of the transmission chamber M via a bearing 72b, and is rotatably supported at the rear end thereof by a bearing recess 73 formed on the rear wall 31r of the transmission chamber M via a bearing 73b.

A first transmission driven gear n1, a fifth transmission driven idle gear n5, a third transmission driven gear n3 formed integrally with the shifter and spline-fitted to the counter shaft 71, a reverse idle gear nR, a second transmission driven idle gear n2, a shifter nS, a fourth transmission driven idle gear n4 are arranged and supported rotatably by the counter shaft 71 in sequence from the front in the transmission chamber M.

The corresponding transmission drive gear and the transmission driven gear are constantly meshed with each other.

A reverse idle shaft 70 is disposed at a position above the counter shaft 71 (see FIG. 3 and FIG. 4), a reverse large diameter gear r1 and a reverse small diameter gear r2 are supported by the reverse idle shaft 70 so as to rotate integrally, the reverse large diameter gear r1 meshes with the second transmission drive gear m2 on the main shaft 61, and the reverse small diameter gear r2 meshes with the reverse idle gear nR on the counter shaft 71.

The fifth transmission drive gear m5 on the main shaft 61 and the third transmission driven gear n3 on the counter shaft 71 are shifter gears, and transmission speeds are achieved by shifting the two shifter gears and the shifter nS in the axial direction by the transmission drive mechanism.

In other words, the first speed and the third speed are achieved by the fore-and-aft shifting of the fifth transmission drive gear m5, the fifth speed and reverse movement are achieved by the fore-and-aft shifting of the third transmission driven gear n3, and the second speed and the fourth speed are achieved by the fore-and-aft shifting of the shifter nS.

The switching control of the transmission speeds and the control of the first transmission clutch 66 and the second transmission clutch 67 cooperate to transmit the power in the respective transmission speeds.

The front end of the counter shaft 71 projects forwardly from the bearing 72b, and an output gear 74 is spline-fitted to the front end.

The output shaft 80 is disposed downwardly and obliquely rightward of the counter shaft 71 (see FIG. 3), and a driven gear 75 spline-fitted to the front portion of the output shaft 80 meshes with the output gear 74 at the front end of the counter shaft 71, so that a power is transmitted from the counter shaft 71 to the output shaft 80.

Since a large load caused by the meshing between the output gear 74 and the driven gear 75 of the output shaft 80 is applied to the output gear 74 at the front end of the counter shaft 71, the bearing 72b for rotatably supporting the front portion of the counter shaft 71, which is employed here, is relatively large.

Therefore, the inner diameter of the bearing opening 72 for fitting the bearing 72b of the front wall 31f is also large. However, since the bearing recess 62 of the adjacent main shaft 61 is small as described before, the strength of the front wall 31f of the crankcase 31 around the output gear 74 may be maintained at a high level.

A front case cover 85 as a case member is covered on the upper and lower crankcases 31U and 31L configured to be divided into upper and lower halves so as to extend across the partitioning plane on the front surface from which the counter shaft 71 and the output shaft 80 project, and a rear case cover 150 as a case member is covered on the upper and lower crankcases 31U and 31L so as to extend across the partitioning plane on the rear surface and cover the fluid coupling 55 at the rear end of the crankshaft 30 and the first and second transmission clutches 66 and 67 at the rear ends of the main shaft 61 via a spacer 110 which also serves partly as a case member.

The output shaft 80 is configured with a front end borne portion 81 and a rear end borne portion 82 which are formed by forging and connected by a hollow cylindrical member 83. The front end borne portion 81 is rotatably supported by a bearing opening 86 formed on the front case cover 85 via a bearing 86b with the front end projecting forward, and the rear end borne portion 82 is rotatably supported by a bearing opening 111 formed on the spacer 110 via a bearing 111b with the rear end projecting rearward.

In other words, in the output shaft 80, the front end borne portion 81 and the rear end borne portion 82 projecting from the front and rear respectively are rotatably supported by the front case cover 85 and the spacer 110.

The front end borne portion 81 of the output shaft 80 penetrates through a through hole 76f formed on the front wall of the lower crankcase 31L, and the rear end borne portion 82 penetrates through a through hole 76r formed on the rear wall of the lower crankcase 31L.

The front through hole 76f is adjacent to the front bearing opening 72 of the counter shaft 71 and the rear through hole 76r is adjacent to the rear bearing recess 73 of the counter shaft 71.

The driven gear 75 is spline-fitted to the front end borne portion 81 adjacently inside a bearing 85b.

Therefore, the output gear 74 at the front end of the counter shaft 71 meshes with the driven gear 75 spline-fitted to the front end borne portion 81 of the output shaft 80, so that a power is transmitted from the counter shaft 71 to the output shaft 80.

Since the output shaft 80 is configured with the front end borne portion 81 and the rear end borne portion 82 which are formed by forging and connected by the hollow cylindrical member 83, the weight of the output shaft 80 may be reduced while securing the rigidity and strength. Simultaneously, a forging apparatus may be downsized in comparison with the case of forging and molding the entire output shaft as in the related art, and the facility cost may also be reduced.

Since the front end borne portion 81 and the rear end borne portion 82 at the both ends of the output shaft are rotatably supported respectively by the front case cover 85 and the spacer 110 which are connected to the front and rear outsides in the direction of the crankshaft of the upper and lower crankcase halves 31U and 31L via the bearings 86b and 11b, the load applied to the crankcases 31U and 31L may be reduced, and the hollow cylindrical member 83 may be elongated so as to bring the front end borne portion 81 and the rear end borne portion 82 at the both ends apart from each other, whereby the structure in which distortion of the output shaft at one end hardly affects the other end is achieved.

Since the output shaft 80 is configured to penetrate through the through holes 76f and 76r in adjacent to the bearing openings 72 and the bearing recess 73 of the counter shaft 71 of the lower crankcase 31L, the output shaft 80 may be positioned as close as possible to the counter shaft 71, so that the power unit P may be downsized.

Even when the output shaft 80 is placed close to the counter shaft 71, the counter shaft 71 is rotatably supported by the crankcases 31U and 31L, and the output shaft 80 is rotatably supported by the front case cover 85. Therefore, the rigidity of the both bearing portions of the counter shaft 71 and the output shaft 80 may easily be secured, and hence the counter shaft 71 and the output shaft 80 may be rotatably supported in a desired manner.

On the other hand, a balancer shaft 90 is rotatably supported by being clamped on the partitioning plane between the upper and lower crankcases 31U and 31L at a position on the right-hand side of the crank shaft 30 (see FIG. 3).

Figure 5:
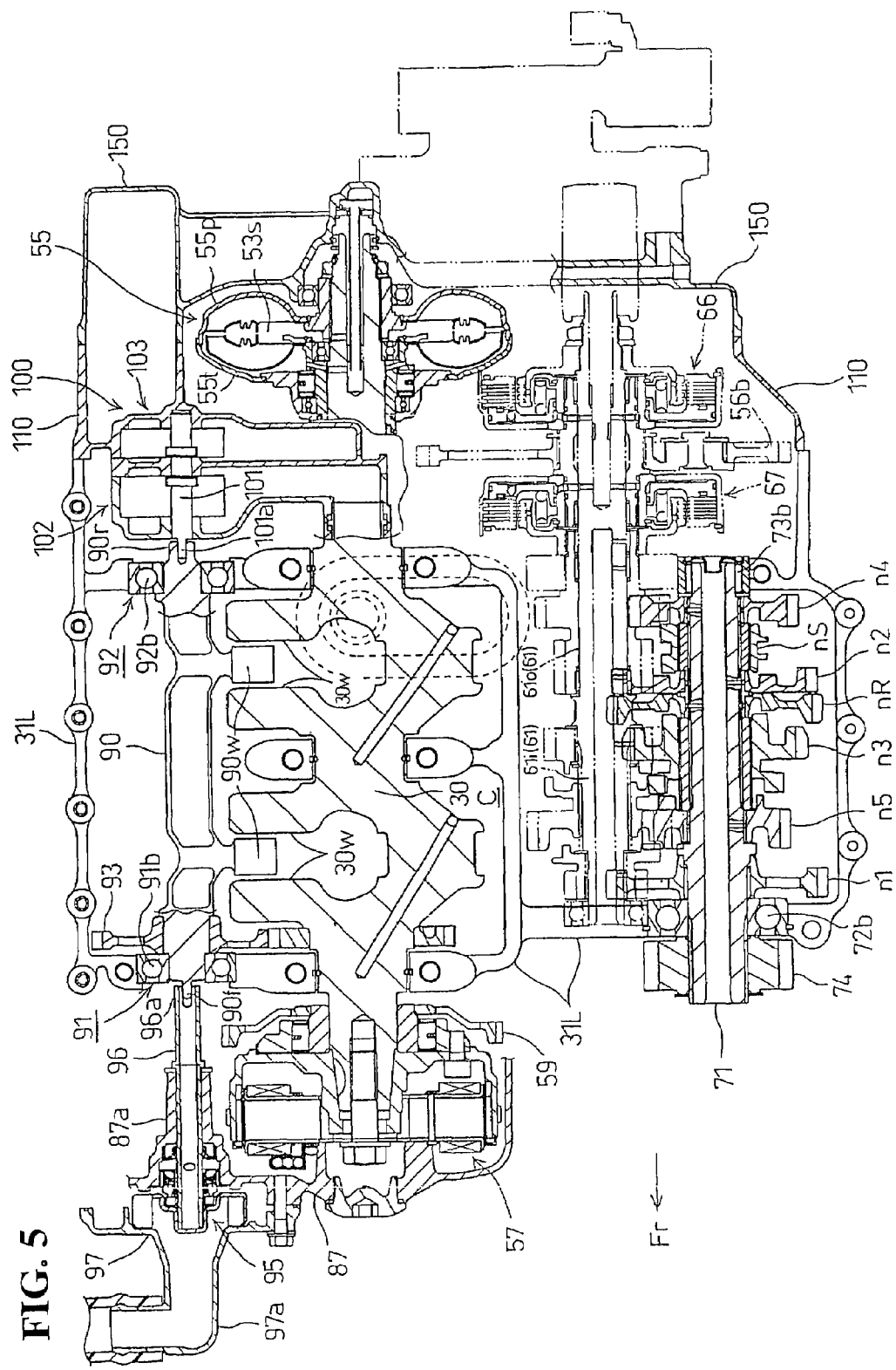
FIG. 5 is a cross-sectional view of the power unit (taken along the lines V-V and V'-V' in FIG. 3)

Referring now to FIG. 5, the balancer shaft 90 is rotatably supported at the front end and the rear end thereof by the bearing openings 91 and 92 formed on the front wall and the rear wall of the upper and lower crankcases 31U and 31L respectively via the bearings 91b and 92b.

The balancer shaft 90 is arranged at a position as close as possible to the crankshaft 30 and, as shown in FIG. 5, a balancer weights 90W of the balancer shaft 90 is overlapped with (counter weights of) crank webs 30w of the crankshaft 30 in the direction of the crankshaft (fore-and-aft direction).

A driven gear 93 is spline-fitted to the bearing 91b fitted at the front end of the balancer shaft 90 adjacently inside the bearing 91b, and the driven gear 93 meshes with the balancer shaft drive gear 54 fitted to the crankshaft 30 so that the rotation of the crankshaft 30 is transmitted to the balancer shaft 90 at the same revolving speed.

Therefore, primary vibrations caused by the reciprocal motion of the pistons 40 are cancelled by the rotation at the same speed as the crankshaft 30 of the balancer shaft 90.

A water pump 95 provided on a front cover member 87 for covering the AC generator 57 or the like from the front is provided forwardly of the balancer shaft 90, and a water pump drive shaft 96 rotatably supported by a bearing cylinder 87a of the front cover member 87 is arranged coaxially with the balancer shaft 90.

A connecting projection 90f projecting forward from the front end of the balancer shaft 90 and a connecting recess 96a formed at the rear end of the water pump drive shaft 96 are fitted so that the rotation of the balancer shaft 90 is transmitted to the water pump drive shaft 96 to drive the water pump 95.

The front side of the water pump 95 is covered with a water pump cover 97 provided with an intake cylinder 97a.

The intake cylinder 97a of the water pump cover 97 is connected by the radiator 27 and a water piping arranged on the front side of the vehicle body, so that the water pump 95 sucks cooling water from the radiator 27.

On the other hand, an oil pump unit 100 provided on the spacer 110 is disposed rearwardly of the balancer shaft 90, an oil pump drive shaft 101 rotatably supported by the oil pump unit 100 is arranged coaxially with the balancer shaft 90.

A connecting recess 90r formed at the rear end of the balancer shaft 90, and a connecting projection 101a projecting at the front end of the oil pump drive shaft 101 are fitted, so that the rotation of the balancer shaft 90 is transmitted to the oil pump drive shaft 101 to drive the oil pump unit 100.

A dry sump system is employed for lubrication of this power unit P, and both rotors of a scavenge pump 102 and a feed pump 103 are mounted to the oil pump drive shaft 101 of the oil pump unit 100.

A transmission drive mechanism 200 for performing shift transmission by shifting the shifter of the transmission gear mechanism 60 of the transmission T is provided below the crankshaft 30 and the main shaft 61.

The lower portion of the rear case cover 150 is formed with a gear case portion which accommodates a speed reduction gear mechanism therein, and is covered by the gear case cover 201 from behind. A transmission power motor 202 is mounted to the right side of the gear case cover 201 from behind, and a shift spindle 206 is provided to the lower left portion thereof so as to penetrate through the front case cover 85, the front and rear walls of the lower crankcase 31L, and the rear case cover 150, and an engaging portion 206a formed into the shape of a hexagonal column at the rear end thereof is projected rearward from the gear case cover 201 (see FIG. 3 and FIG. 6).

Provided at the front end of the shift spindle 206 is an angle sensor 207 fixedly mounted to the front case cover 85.

A first idle gear shaft 203 and a second idle gear shaft 204 are rotatably supported in the gear case, and a small-diameter drive gear 202a formed on the motor drive shaft projecting forward from the gear cover 201 of the transmission power motor 202 meshes with a large-diameter gear 203a formed integrally with the first idle gear shaft 203, a small diameter gear 203b formed integrally with the first idle gear shaft 203 meshes with a large diameter gear 204a formed integrally with the second idle gear shaft 204, and a small gear 204b formed integrally with the second idle gear shaft 204 meshes with a fan-shaped gear shift arm 205 fitted to the shift spindle 206, whereby the speed reduction gear mechanism is configured.

Therefore, the drive of the transmission power motor 202 is decelerated via the speed reduction gear mechanism and rotates the shift spindle 206.

A shift drum 210 is rotatably supported obliquely upwardly of the shift spindle 206 between the front and rear walls of the lower crankcase 31L, and shift transmission means 208 is interposed between the shift spindle 206 and the shift drum 210, so that the rotation of the shift spindle 111 rotates the shift drum 210 via the shift transmission means 208.

Figure 6:
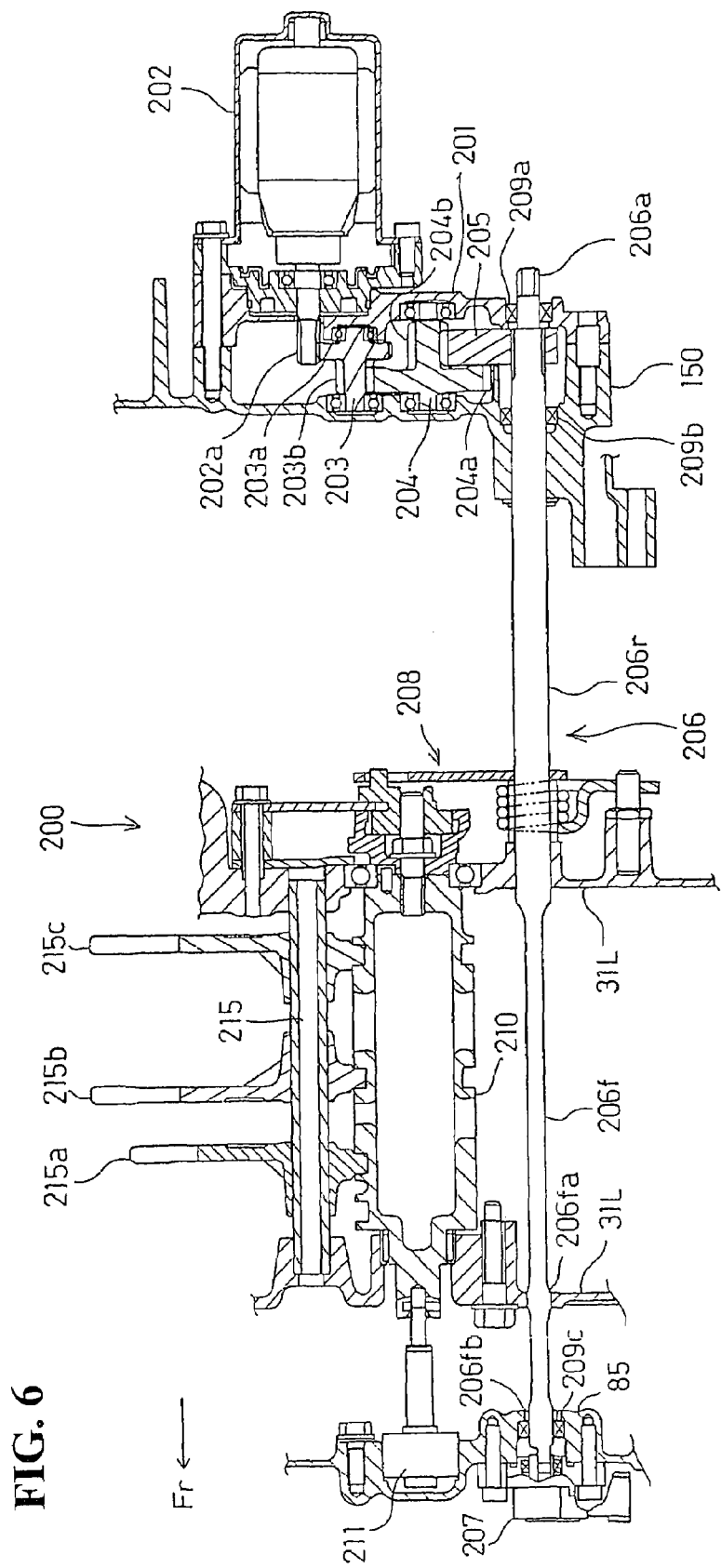
FIG. 6 is a developed cross-sectional view of a transmission drive mechanism.

As shown in FIG. 6, respective shift pins of shift forks 215a and 215b and 215c slidably supported by the guide shaft 215 are fitted in three ridges of the shift grooves formed on the outer peripheral surface of the shift drum 210, and the shift fork 215a which is guided along the shift groove by the rotation of the shift drum 210 in the axial direction moves the shifter gear (fifth transmission drive gear m5) on the main shaft 61, and the shift forks 215b and 215c move the shifter gear (third transmission driven gear n3) on the counter shaft 71 and the shifter nS to change the combination of gears to be meshed with each other for shift transmission.

The rotational angle of the shift drum 210 is detected by a shift position detector 211 provided in front of the shift drum 210 coaxially therewith.

With the transmission drive mechanism 200 described above, the drive of the transmission power motor 202 rotates the shift spindle 206 via the speed reduction gear mechanism, and the rotation of the shift spindle 206 rotates the shift drum 210 via the shift transmission means 208, so that the shift forks 215a, 215b and 215c are shifted by the rotation of the shift drum 210 for shift transmission.

Then, by engaging an operating portion of a hexagonal hole of a wrench, which is a rotating tool with an engaging portion 111a in the shape of the hexagonal column of the shift spindle 206 projected rearward from the gear case cover 201, and rotating the same along the surface of the rear case cover 150, the shift spindle 206 may be rotated to achieve manual shift transmission.

Here, while a rear half portion 206r of the shift spindle 206 from the rear case cover 150 to the rear wall of the lower crankcase 31L is a power transmitting portion, and hence is formed to have a large diameter, a front half portion 206f is formed to have a small diameter since a load of the power transmission is not applied thereto.

The rear half portion 206r is rotatably supported by the gear case cover 201 and the rear case cover 150 via the bearings 209a and 209b, and is rotatably supported by the rear wall of the lower crankcase 31L.

The front half portion 206f having a small diameter has a structure in which only borne portions 206fa and 206fb rotatably supported by the front wall of the lower crankcase 31L and the front case cover 85 via a bearing 209c are enlarged in diameter.

In this manner, weight reduction is achieved by forming the front half portion 206f which is simply operating the angle sensor 207 and is not applied with the load of power transmission to have a small diameter.

Figure 7:
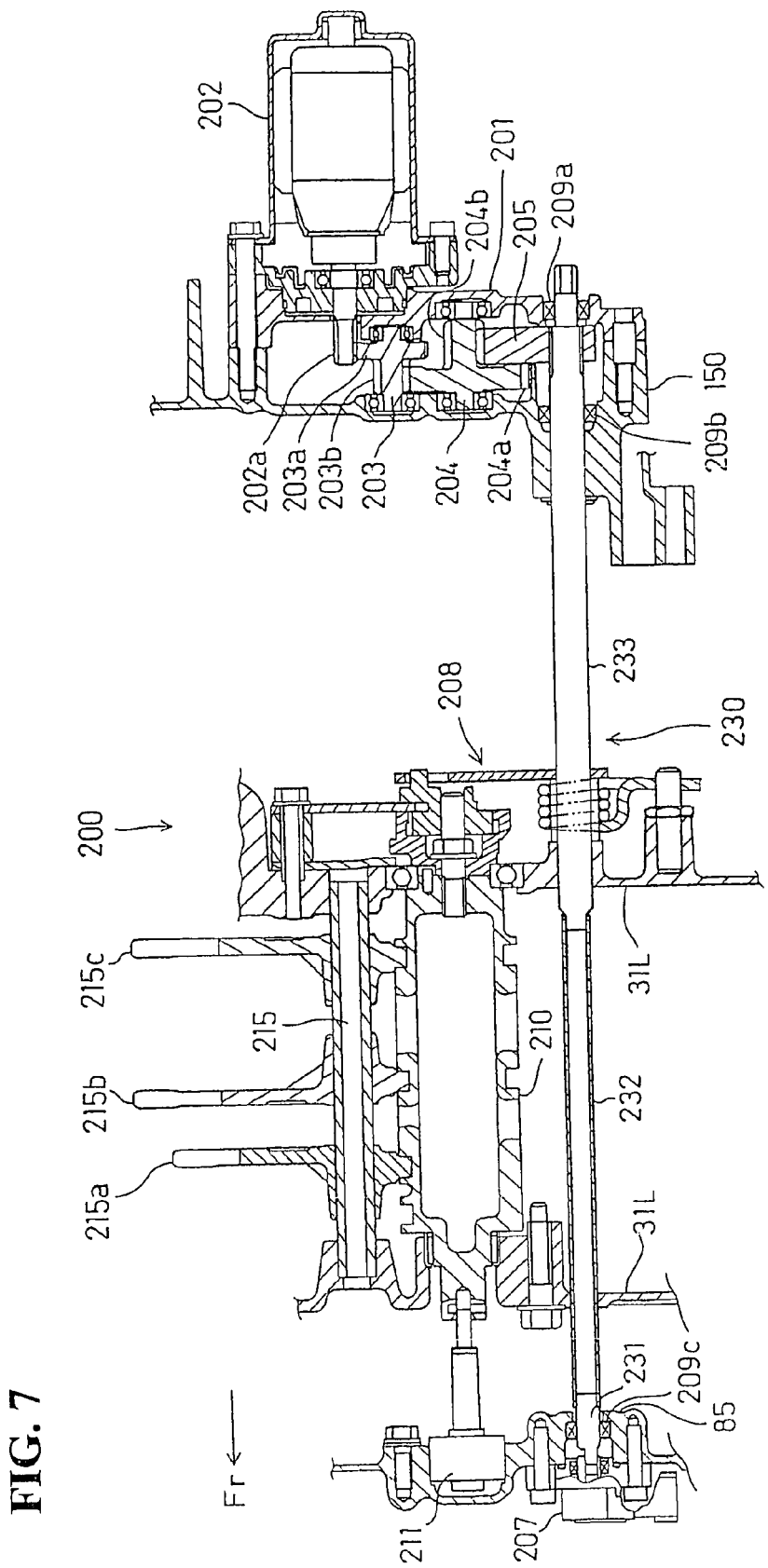
FIG. 7 is a developed cross-sectional view of the transmission drive mechanism according to another modification.

A modification of the shift spindle 206 is shown in FIG. 7.

The components of this transmission drive mechanism are the same as the example shown in FIG. 6 other than a shift spindle 230, and are represented by the same reference numerals.

The shift spindle 230 has a structure in which a cylindrical member 232 is connected between a front end borne portion 231 and a rear half member 233, the front end borne portion 231 is rotatably supported by the front case cover 85, the rear half member 233 as the power transmitting portion is substantially the same as the rear half portion 206r of the shift spindle 206, and is rotatably supported between the rear wall of the lower crankcase 31L and the rear case cover 150.

A cylindrical member 232 connects the front end borne portion 231 and the rear half member 233 by penetrating through the front wall of the lower crankcase 31L.

The portion which is not applied with the load of the power transmission is configured as the cylindrical member 232 so as to achieve the weight reduction.

Figure 8:
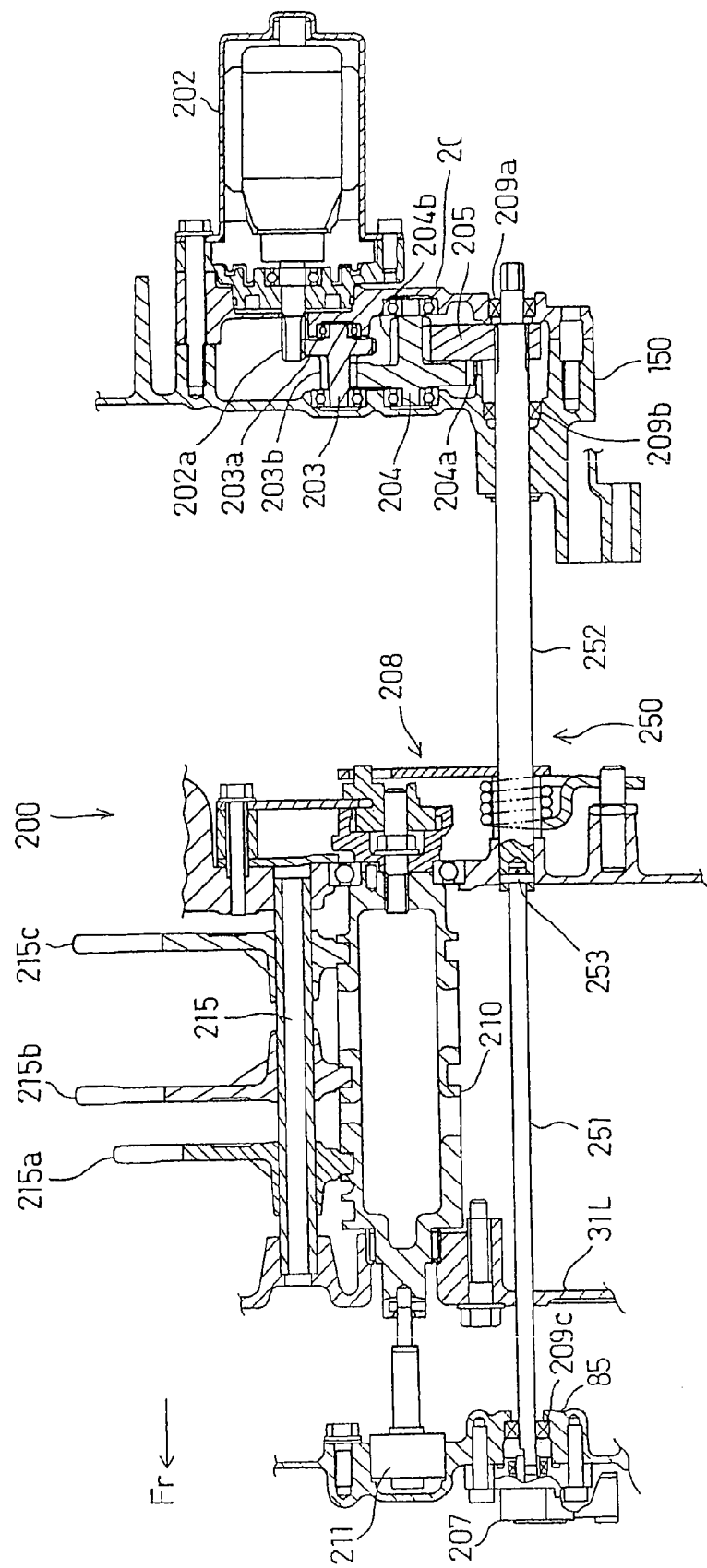
FIG. 8 is a developed cross-sectional view of the transmission drive mechanism according to still another modification.

Another modification of the shift spindle is shown in FIG. 8.

The shift spindle 250 coaxially connects a front half member 251 and a rear half member 252, and the rear half member 252 as the power transmitting portion is configured to have a large diameter, and the front half member 251 to which the load of power transmission is not applied is configured to have a small diameter.

The rear end of the front half member 251 having the small diameter is fitted to the axial hole formed on the front end surface of the rear half member 252 having the large diameter, and the both members are connected by a pin 253 fitted into the diametrical direction.

The front half member 251 to which the load of the power transmission is not applied is formed to have the small diameter, so that the weight reduction is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An output shaft of a power unit having a driven gear for supplying power of an internal combustion engine of the power unit via a transmission mechanism for outputting the power to an outside of a unit case, the output shaft comprising:
    a hollow cylindrical member; and
    two borne members inserted, respectively, into opposite ends of the hollow cylindrical member of the output shaft,
    wherein the borne members are rotatably supported by the unit case via bearings, and
    the driven gear is fitted to one of the two borne members that is disposed adjacently to one of the bearings.

2. The output shaft of the power unit according to claim 1, wherein the unit case includes:
    a crankcase divided into an upper half and a lower half; and
    a pair of case members connected respectively to each of two outsides of the crankcase in a direction of a crankshaft, and
    wherein the borne member at each of the ends of the output shaft is rotatably supported by the case members at the two outsides of the crankcase via the bearings.

3. The output shaft of the power unit according to claim 2, wherein the power unit is mounted to a vehicle and the crankshaft is oriented in a fore-and-aft direction of the vehicle,
    the crankcase further comprising a through hole formed on one of the upper and lower crankcase halves in a position adjacent to a bearing portion of a transmission shaft,
    the output shaft penetrating through the through hole, and
    the transmission shaft rotatably supported by the crankcase.

4. The output shaft of the power unit according to claim 2, wherein the two borne members include a front end borne portion that penetrates through a front through hole formed on a front wall of the lower crankcase half, and a rear end borne portion that penetrates through a rear through hole formed on a rear wall of the lower crankcase half.

5. The output shaft of the power unit according to claim 4, wherein the front through hole is adjacent to a front bearing opening of a counter shaft, and the rear through hole is adjacent to a rear bearing recess of the counter shaft.

6. The output shaft of the power unit according to claim 1, wherein the output shaft is disposed downwardly and obliquely rightward of a counter shaft and the driven gear is spline-fitted to a front portion of the output shaft, and meshes with an output gear at a front end of the counter shaft, so that the power is transmitted from the counter shaft to the output shaft.

7. The output shaft of the power unit according to claim 2, wherein the case members include:
    a front case cover for covering the upper and lower crankcases halves and extending across a partitioning plane on a front surface of the crankcase from which a counter shaft and the output shaft project; and
    a rear case cover for covering the upper and lower crankcases halves and extending across the partitioning plane on a rear surface of the crankcase.

8. The output shaft of the power unit according to claim 1, wherein a distance between the bearings which support the borne members is longer than a length of the cylinder member.

9. An output shaft of a power unit mounted on a vehicle, comprising:
    a cylindrical member having two open ends; and
    two borne member inserted respectively into each of two open ends of the cylindrical member of the output shaft,
    a driven gear fitted to one of the two borne members that is disposed adjacently to bearings, the driven gear for supplying power of an internal combustion engine of the power unit via a transmission mechanism and for outputting the power to an outside of a unit case,
    wherein the borne members are rotatably supported by the unit case via the bearings.

10. The output shaft of the power unit mounted on a vehicle according to claim 9, wherein the unit case includes:
    a crankcase divided into an upper half and a lower half; and
    a pair of case members connected respectively to each of two outsides of the crankcase in a direction of a crankshaft, and
    wherein the borne member at each of the ends of the output shaft is rotatably supported by the case members at the two outsides of the crankcase via the bearings.

11. The output shaft of the power unit mounted on a vehicle according to claim 10, wherein the crankshaft is oriented in a fore-and-aft direction of the vehicle,
    the crankcase further comprising a through hole formed on one of the upper and lower crankcase halves in a position adjacent to a bearing portion of a transmission shaft,
    the output shaft penetrating through the through hole, and
    the transmission shaft rotatably supported by the crankcase.

12. The output shaft of the power unit mounted on a vehicle according to claim 10, wherein the two borne members include a front end borne portion that penetrates through a front through hole formed on a front wall of the lower crankcase half, and a rear end borne portion that penetrates through a rear through hole formed on a rear wall of the lower crankcase half.

13. The output shaft of the power unit mounted on a vehicle according to claim 12, wherein the front through hole is adjacent to a front bearing opening of a counter shaft, and the rear through hole is adjacent to a rear bearing recess of the counter shaft.

14. The output shaft of the power unit mounted on a vehicle according to claim 9, wherein the output shaft is disposed downwardly and obliquely rightward of a counter shaft and the driven gear is spline-fitted to a front portion of the output shaft, and meshes with an output gear at a front end of the counter shaft, so that the power is transmitted from the counter shaft to the output shaft.

15. The output shaft of the power unit mounted on a vehicle according to claim 10, wherein the case members include:
   a front case cover for covering, the upper and lower crankcases halves and extending across a partitioning plane on a front surface of the crankcase from which a counter shaft and the output shaft project; and
   a rear case cover for covering the upper and lower crankcases halves and extending across the partitioning plane on a rear surface of the crankcase.

16. The output shaft of the power unit mounted on a vehicle according to claim 9, wherein bearings which support the borne members are arranged further to a front and rear than the respective open ends of the cylinder member.

17. An output shaft of a power unit, comprising:
   a hollow cylindrical member disposed in a lower part of the power unit;
   a borne member connected at each of two ends of the hollow cylindrical member of the output shaft; and
   a driven gear fitted to one of the two borne members disposed adjacently to bearings, the driven gear for supplying power of an internal combustion engine of the power unit via a transmission mechanism and for outputting the power to an outside of a unit case,
   wherein the borne members are rotatably supported by the unit case via the bearings, wherein the unit case includes;
   a crankcase divided into an upper half and a lower half; and
   a pair of case members connected respectively to each of two outsides of the crankcase in a direction of a crankshaft, and
   wherein the borne member at each of the ends of the output shaft is rotatably supported by the case members at the two outsides of the crankcase via the bearings.

18. The output shaft of the power unit according to claim 17, wherein the cylinder member has an outer diameter which is uniform from end-to-end.

19. The output shaft of the power unit according to claim 17, wherein the crankshaft is oriented in a fore-and-aft direction of the vehicle,
   the crankcase further comprising a through hole formed on one of the upper and lower crankcase halves in a position adjacent to a bearing portion of a transmission shaft,
   the output shaft penetrating through the through hole, and the transmission shaft rotatably supported by the crankcase.

* * * * *